United States Patent [19]

Heling

[11] 4,219,235
[45] Aug. 26, 1980

[54] INSERTABLE ARMREST FOR A VEHICLE SEAT

[75] Inventor: Dennis H. Heling, Milwaukee, Wis.

[73] Assignee: UOP Inc., Des Plaines, Ill.

[21] Appl. No.: 973,198

[22] Filed: Dec. 26, 1978

[51] Int. Cl.$^2$ ............................................... A47C 7/54
[52] U.S. Cl. ................................................... 297/417
[58] Field of Search .............. 247/113, 114, 411, 416, 247/417, 422

[56] References Cited

U.S. PATENT DOCUMENTS

| 3,807,799 | 4/1974 | Freedman | 297/417 |
| 3,967,851 | 7/1976 | Stier | 297/416 |
| 3,993,350 | 11/1976 | McFarlane | 297/417 |
| 4,040,665 | 8/1977 | Wallace et al. | 297/417 |
| 4,118,069 | 10/1978 | Hunter | 297/416 |

FOREIGN PATENT DOCUMENTS 2315241  1/1977  France .................... 297/417

*Primary Examiner*—James C. Mitchell
*Attorney, Agent, or Firm*—James R. Hoatson, Jr.; Bary L. Clark; William H. Page, II

[57] ABSTRACT

Insertable armrest frame and mounting structure is designed so that an upholstered, pivotable armrest can be easily attached to an upholstered seat back in such a manner that the mounting elements will be concealed. The mounting and support structure is quite light in weight but very strong due to use of an arm frame member which incorporates at least one strengthening rib portion. The arm frame pivots on one pivot pin anchored to the seat back frame and, in a preferred embodiment, includes a strengthening rib incorporating a cup-shaped portion having a curved flat rim which is slightly resiliently deformed by a flanged retaining nut on a stop pin which is also anchored in the seat back frame. The resilient deformation provides uniform tension which tends to hold the arm in any position to which it is rotated. An enlarged opening and a detent formed adjacent one end of the curved rim permit the arm to be easily assembled to the pivot pin and stop pin with a push and turn movement while preventing its unauthorized removal. An adjustment screw on the arm frame controls the angle of the arm in its use position. A generally U-shaped tubular support frame provides a very rigid mounting for the armrest and functions somewhat as a torque tube to transmit loads to the opposite side of the seat frame.

13 Claims, 6 Drawing Figures

U.S. Patent    Aug. 26, 1980    4,219,235
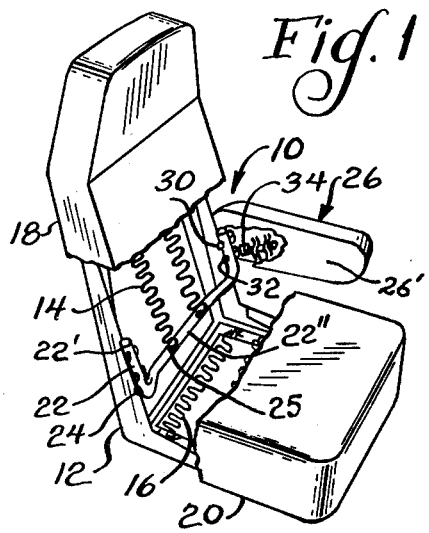
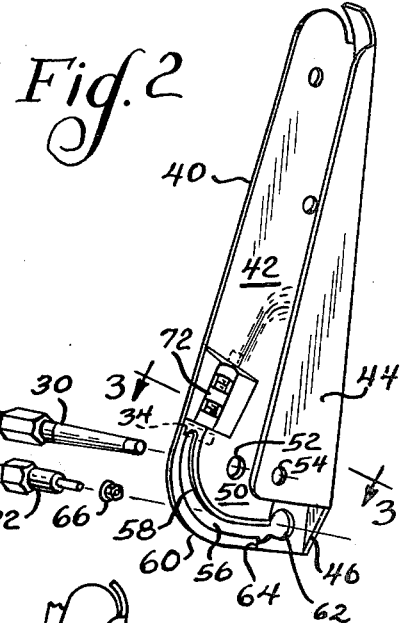
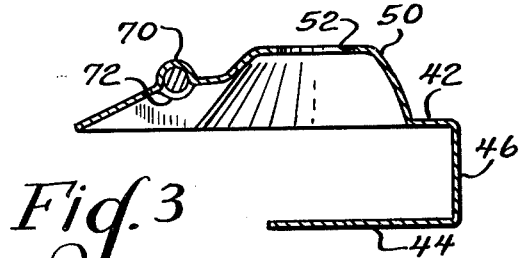
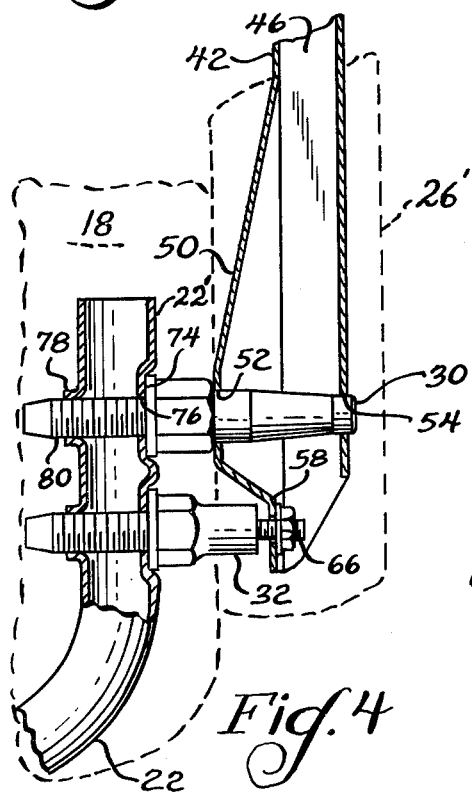
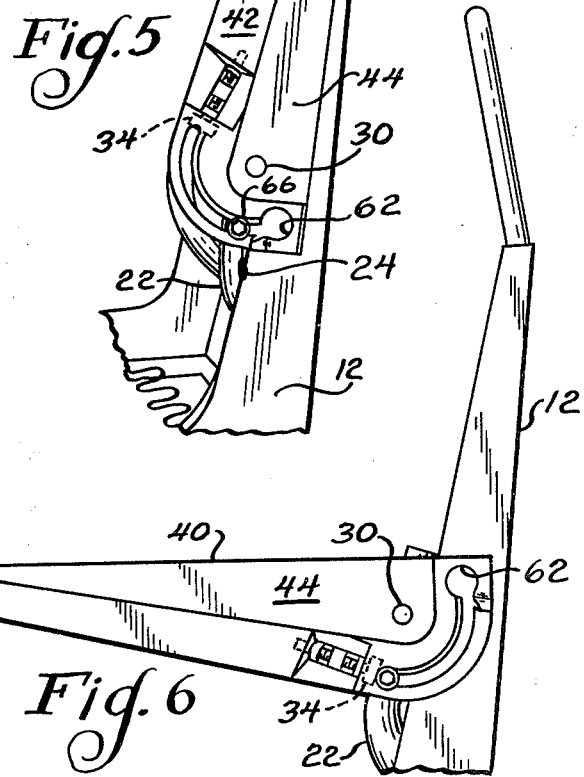
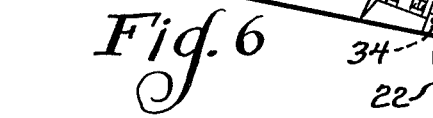

INSERTABLE ARMREST FOR A VEHICLE SEAT

BACKGROUND OF THE INVENTION

The invention relates to vehicle seats and particularly to armrests for such seats which can be added after the seat is purchased. Seats for trucks, vans and the like are often purchased as extra cost options, especially when a suspension type seat is desired. After the seats are in use for some time a desire often arises to increase the comfort of the occupant by adding armrests. A number of seats are disclosed in the patent literature and/or are available in the marketplace which permit an armrest to be added to an upholstered seat at a later date. These include Stier U.S. Pat. No. 3,967,851; Freedman U.S. Pat. No. 3,807,799; Wallace et al U.S. Pat. No. 4,040,665; Hunter U.S. Pat. No. 4,118,069 and a seat sold by the Mitchell-Bentley Corporation. The latter seat requires a dozen or more parts including a pair of brackets which must be attached to the outside of the seat frame and the outside of the arm frame.

One vehicle manufacturer's specification for armrests requires that they be able to resist a 200 pound downward load and a 100 pound outward load applied 10.87" from the pivot and that no more than 0.25" permanent set can be measured after such loading. Such loading can easily be applied by a person who is on the ground and grabs the seat arm in a high cab truck to assist his entry into the cab. Available armrests of which I am aware for use in such situations are quite expensive, heavy, have many parts, and either fail to meet or are very marginal in meeting the load specifications set forth supra. Most of them are not able to conceal their mounting structure from view while others require that the arm upholstery be removed during assembly. Many are unable to provide equal tension to resist the pivotal movement of both arms on the same seat or uniform tension over the range of movement of a single arm.

SUMMARY

It is among the objects of the present invention to provide an armrest which is strong, lightweight, easy to assemble and remove and economical to manufacture and assemble to a seat. These and other objects and advantages are provided by the seat and armrest of the present invention. Whereas most seats seem to utilize heavy brackets welded to the seat back frame to support the armrest, I prefer to utilize a length of tubing which is bent in a generally shallow U-shape so that is has a horizontal crossbar portion and short vertical end portions which are welded to the two sides of the seat back frame. Two transverse openings through each of the end portions are adapted to be engaged by self-tapping threads on a pivot pin and a stop pin which are passed through an opening made in the seat back cushion upholstery when the armrest is to be attached. The tubular member provides a stronger mounting than the usual bracket member since the end portions and the crossbar portion function as a torsion tube to carry some of the loading from one side of the seat back frame to the other when the end of the armrest is pulled outwardly away from the seat. The tube also acts as a torsion tube to resist downward loads applied to the armrest so that a portion of the load is transferred to the opposite side of the seat. In a preferred embodiment, the armrest frame comprises a single piece of metal, plastic, or other material which is formed in the shape of a channel in such a way that, even when it is fully upholstered or trimmed, it may be assembled to the aforementioned pivot pin and to a stop pin having a flanged retaining nut on it by merely pushing it and then turning it past a locking detent which prevents unauthorized removal. Removal can, however, be made when necessary by inserting a tool such as the blade of a screwdriver between the detent and retaining flange. Angular adjustment of the arm is provided by an elongated screw which is adjustably threaded into integral retaining means formed in the inner wall of the channel member by forming a series of short, parallel slits in the wall and then deforming the material located between successive pairs of slits inwardly and outwardly. The deformed material can be pre-threaded or could be threaded when engaged by a self-threading adjustment screw. The top and outer wall of the channel are preferably flat while the inner wall includes a longitudinal rib portion which projects outwardly towards the seat from the general flat plane of the inner wall. The rib serves not only to stiffen and strengthen the frame but includes a cup-shaped portion near the pivot end of the arm which has a bearing portion formed in its center and a flat narrow curved rim portion around a portion of its periphery. The bearing portion in the cup portion of the arm supports the inner bearing portion of the pivot pin at a considerably greater distance from a co-axial bearing portion formed in the outer wall of the channel-like frame member than the distance between the planar portions of the two walls. Thus, the stability of the armrest and its ability to resist deformation from pull-out loads is greatly enhanced. The flat, narrow rim portion of the cup-shaped portion of the inner wall of the arm frame defines the inner edge of a curved slot whose outer edge is defined by a web of material at one end of the arm frame. The cup-shaped portion of the strengthening rib which is deformed out of the inner wall greatly enhances the rigidity of the curved narrow rim portion which is slightly resiliently compressed by an adjustable flange nut on the stop pin. An elastic force reaction produces tension in the arm which eliminates any possibility of rattling while providing a smooth, adjustable degree of resistance to movement which remains constant over a long period of time. Although the mounting and angle adjustment structure of the arm is hidden from view by the trim of the back cushion and arm, the foam and trim of the arm in the area of the stop pin and the angle adjustment screw may be easily depressed when desired to provide access for adjusting the screw or removing the arm.

BRIEF DESCRIPTION OF THE DRAWINGS

FIG. 1 is a fragmentary perspective view showing my improved armrest in operative association with a novel support tube which is integrally attached to the seat frame;

FIG. 2 is an exploded perspective view showing the arm frame member and its relationship to the two pins by which it is attached to the seat;

FIG. 3 is a cross-sectional view taken on line 3—3 of FIG. 2;

FIG. 4 is a front sectional view showing the armrest frame, the tubular support frame, and the pins that mount the arm frame to the support frame in such a way that the mounting structure is normally hidden from view, as indicated by the dotted line positions of the seat and arm upholstery;

FIG. 5 is a side perspective view showing the relationship between the arm frame and support frame when the armrest is in its vertical storage position; and FIG. 6 is a side view somewhat similar to FIG. 5 but showing the armrest in its use position.

DESCRIPTION OF THE PREFERRED EMBODIMENT

In FIG. 1 my improved insertable armrest assembly is indicated generally at 10 and is shown as being mounted on a seat frame 12 which includes back cushion support springs 14 and seat cushion support springs 16 which are respectively positioned interiorly of a seat back cushion portion 18 and a seat bottom cushion portion 20. A tubular support member 22, which preferably is made of metal and includes a pair of vertical end portions 22' connected by a crossbar portion 22", is welded to the seat frame 12 by welds 24. As seen in FIG. 1, the tubular support 22 has its vertical end portions 22' in a plane which is somewhat offset from the recessed plane of the crossbar portion 22" so that the springs 14 which are mounted to apertures 25 in the crossbar may be positioned deep within the back cushion portion 18. The armrest indicated generally at 26 has its upholstery or trim 26' partially broken away in FIG. 1 to illustrate some of the internal structure. Although only one armrest is illustrated, a mirror image armrest could obviously be positioned on the other side of the seat. The armrest is mounted to one of the tubular end portion 22' by a pivot pin 30 and a stop pin 32. The armrest pivots about the pivot pin 30 while the stop pin 32 limits the angular motion range of the armrest. An adjustable stop screw 34 engages the side of the stop pin 32 in the use position of the armrest and permits a limited degree of adjustment of the armrest angular use position within a selected range. The adjustable head of the stop screw 34 is normally hidden from view under the armrest upholstery or trim 26' but may be manipulated when the arm is in its vertical position by slightly pulling the trim aside to permit access for an appropriate tool or for one's fingers when a thumb screw type of adjustment is provided.

Referring to FIG. 2, the basic working portions of the armrest are shown in exploded relationship. The seat back cushion 18, which normally has a smooth, uninterrupted side surface before one decides to mount an armrest to it, is shown as having had a pair of tiny apertures 18, 18" placed in the covering and underlying foam padding at appropriate locations for receipt of the pivot pin 30 and stop pin 32 which support the generally U-shaped armrest frame 40. The armrest frame includes an inner leg or wall portion 42, an outer leg or wall portion 44 and a connecting flat top wall portion 46. The strength and resistance to bending and twisting of the armrest flange 40 is increased substantially over the strength which one might expect from a member having a width only as great as the top portion 46 by providing an integral rib portion in the inner wall 42 so as to produce a cup-shaped portion 50. An aperture 52 formed in the cup-shaped portion 50 and another aperture 54 formed in the outer wall 44 comprise bearing surfaces which engage complementary spaced apart bearing portions of the outer end of the pivot pin 30 as seen in FIG. 4. The great distance between the bearing surfaces 52, 54 compared to the width of the top portion 46 greatly increases the strength of the armrest. A curved slot 56 is formed concentrically about the axis of aperture 52 and is partially defined by a flat inner rim surface 58 which is quite resistant to deflection since it is located immediately adjacent and at right angles to the cup-shaped formation 50. The outer edge of the curved slot 56 is defined by an outer rim portion 60 which is an integral portion of the inner wall surface 42. The principal function of the outer rim 60, which is quite weak compared to the inner rim 58, is to provide a supporting structure which the trim material 26' can engage. The curved slot terminates at one end in a greatly enlarged opening 62 which is of sufficient size to provide clearance during assembly for the flanged retaining nut 66. The nut 66 is preferably threaded onto the threaded end of the stop pin 32 prior to assembly of the arm 40 to the tubular support 22 since it is inaccessible after assembly. The outer rim 60 is deformed so as to provide a ramped detent portion 64 adjacent the enlarged opening 62. The detent 64 is ramped in such a direction that the armrest frame 40 can be assembled in the position shown in FIG. 2 to cause the flanged retaining nut 66 to pass completely through the opening 62 in an axial direction. At this point, rotation of the armrest forwardly and downwardly toward its use position will cause the nut 66 to snap over the detent 64 which will then serve to prevent the nut 66 from moving out of the slot 56 and back into the enlarged opening 62 without the use of some sort of prying tool being positioned between it and the detent. Access to the nut 66 for this purpose is also possible by depressing the trim 26' as previously discussed in connection with the adjustment screw 34. The adjustment screw 34 is positioned inboard of the inner wall portion 42 and is threadedly engaged with a plurality of alternately formed strip members 70, 72 which are slit and then formed out of the material of the wall 42 as best seen in FIGS. 2 and 3. Where the adjustment screw 34 is of the self-tapping variety, it may be used to provide threads in the strip portions 70, 72. Where a finger adjustable screw is desirable, the threads are preferably preformed in the strips 70, 72. As can be seen in FIG. 4, the pivot pin 30 includes a shoulder portion which is engaged by the vertical face of the cup-shaped portion 50 as the armrest is assembled. The shoulder portion provides a stop portion so that the axial pressure applied to the flat inner rim surface 58 by the flanged retaining nut 66 during assembly will deflect the surface 58 inwardly of the plane of wall portion 42. The deflection serves to insure that the armrest will be held under tension which will tend to hold it in any position to which it is rotated.

Referring to FIG. 4, the vertical end portions 22' of the tubular support 22 are preferably formed so as to provide full supports for the pins 30, 32 without the necessity of additional brackets as are usually required. The outwardly facing wall of the tube end is provided with a pair of flat compressed areas 74 which form a good base for the shouldered central portions of the pins 30, 32. An aperture 76 in the center of the depressed area 74 is preferably formed by punching, and after this aperture is formed, access is available to the inwardly facing wall of the tube so that a piercing tool (not shown) may be inserted to bend and force out the displaced material of the inwardly facing wall into the axially extending surface 78 shown in FIG. 4. The portion 78 can be tapped, or preferably, the pins 30, 32 are provided with self tapping threads. The side walls of the aperture 76 can also be tapped for additional retention of the pins. The internal diameter of portion 78 is slightly less than of aperture 76 since the piercing tool would have to pass through the aperture 76 and the pierced portion 78 would spring back slightly after the tool was withdrawn.

Although the armrest frame 40 has been described as being of metal in a channel-like shape, it could also be formed of other materials, such as plastic, and in other shapes, without departing from the scope of my invention.

I claim as my invention:

1. A seat and an insertable armrest therefor comprising a seat back frame; armrest mounting means carried by said seat back frame on at least one side thereof; a seat back cushion mounted on said seat back frame and having a side portion overlying and concealing said armrest mounting means; an elongated, generally horizontal pivot axle member having an inner end portion which is adapted to be firmly engaged and retained by said armrest mounting means after a first access opening has been made in said side portion of said back cushion; an armrest frame member having an elongated flat top wall surface and at least one generally vertical side wall surface integrally formed therewith, bearing means integrally formed in said frame member including at least inner and outer axially aligned bearing portions which are engaged with complementary bearing portions on said pivot axle member, said inner and outer bearing portions being spaced apart by a distance greater than the width of said top wall surface at its closest location to said bearing portions and at least one of said bearing portions being supported by integral rib means at a location axially displaced from any axially transverse vertical plane that includes said top wall surface; a stop portion on said pivot axle member for engaging and limiting the movement of said armrest frame member along the axis of said pivot axle member toward said seat back frame; an elongated stop member parallel to and spaced from said pivot axle member and having an inner end portion which is adapted to be firmly engaged and retained by said armrest mounting means after a second access opening has been made in said side portion of said back cushion; a stop portion formed on the peripheral side surface of said stop member engageable with rotation limiting stop means on said armrest frame member, a retaining element carried by said stop member, said retaining element being positioned generally under the top wall surface of said armrest frame member and bearing against a generally vertically positioned flat rim surface defining one edge of a curved slot integrally formed in said armrest frame member so as to deform said flat rim surface and resiliently force said armrest frame member toward said seat back cushion and into contact with said stop portion on said pivot axle member.

2. The apparatus of claim 1 wherein said armrest mounting means comprises a generally U-shaped formed metal tube which has a pair of generally vertical end portions welded to the side portions of said metal seat back frame and an elongated horizontal portion which connects said end portions, a pair of horizontal spaced apertures formed in at least one of said end portions for threadedly receiving a threaded inner end portion of said pivot axle member and a threaded inner end portion of said elongated stop member.

3. The apparatus of claim 2 wherein each of said apertures is formed by providing a first opening in one wall of the tube and a second opening in the opposed wall, at least said second opening being of a lesser diameter than the threaded inner end portions and being threaded by the passage of said threaded inner end portions therethrough, said second opening in the opposed wall being formed by a piercing operation so that the material moved during the piercing operation forms the sides of said opening so as to have a length substantially greater than the thickness of the tube wall adjacent thereto.

4. The apparatus of claim 3 wherein said opening in said one wall of the tube has a flat planar area immediately around it which is deformed radially inwardly of the outer wall of the tube and is normal to the axis of the tube.

5. The apparatus of claim 1 wherein said rotation limiting stop means comprises an adjustment screw threadedly engaged with said armrest frame member.

6. The apparatus of claim 5 wherein at least three alternating aligned portions of said generally vertical side wall surface are deformed to opposing sides of said side wall surface, said aligned portions having threads therein which are complementary to said adjustment screw.

7. The apparatus of claim 1 wherein said side wall surface of said armrest frame member has an outwardly extending strengthening rib portion formed therein, said rib portion being cup-shaped at the end of said frame at which said frame is pivoted, one of said bearing portions on said axle member being received within an aperture formed in the cup-shaped portion of said side wall surface; a curved slot in said side wall surface having its inner edge defined by a narrow rim portion which surrounds a portion of said cup-shaped portion, the outer edge of said curved slot being defined by a web of material which is integral with and coplanar with the non-ribbed portion of said side wall surface, said narrow rim portion being engaged by a flanged nut retaining element which is mounted on said stop member, said stop member passing through said curved slot.

8. The apparatus of claim 7 wherein one end of said curved slot is enlarged to a dimension at least as large as the diameter of said flanged nut retaining element, said enlarged dimension permitting said armrest frame to be assembled to said pivot axle member and stop member in an axial direction and then be rotated about said pivot axle.

9. The apparatus of claim 8 wherein one of the edges of said curved slot is deformed out of the plane of the side wall surface adjacent the enlarged end of said slot so as to form a limit stop which normally prevents movement of the flanged nut retaining element back into the enlarged end after it has once been moved past the limit stop into the slot.

10. Apparatus for supporting at least one armrest on a vehicle seat comprising a metal seat back frame; a seat back cushion mounted on said frame; said frame having generally vertical side portions; a tubular metal support member which is formed in a shallow U-shaped configuration with short generally vertical end portions and an elongated horizontal intermediate portion, said end portions being welded to said generally vertical side portions; a pair of horizontal spaced apertures formed through the opposed walls of each of the end portions, said apertures in each end portion being adapted to receive and positively retain a pair of support pins which are in turn adapted to pivotally mount and retain an armrest member; said tubular metal support member having an ability to transmit a portion of the torque applied to one end portion to the other end portion when large downward and/or pull-out loads are applied to an armrest mounted thereon.

11. The apparatus of claim 10 wherein each of said horizontal apertures formed in said end portions include an opening in the outwardly facing tube wall of a predetermined diameter and an opening in the inwardly facing tube wall of a lesser diameter, the opening of lesser diameter being formed by a piercing operation so that the material displaced by the piercing operation extends horizontally from the inner tube wall in a fashion suitable for having threads formed in it when engaged by a self-threading screw portion carried at the inner end of a support pin adapted to be retained by said aperture.

12. The apparatus of claim 11 wherein the outwardly facing tube wall is deformed inwardly in the region immediately around said openings of predetermined diameter to form a flat surface which is normal to the axis of said openings.

13. The apparatus of claim 12 wherein said generally verticle end portions of said tubular support member have their axes in common plane which is offset forwardly of the axis of said elongated intermediate portion.

* * * * *